(12) United States Patent
Biltcliffe et al.

(10) Patent No.: US 11,344,834 B2
(45) Date of Patent: May 31, 2022

(54) FILTER ASSEMBLY

(71) Applicant: Dyson Technology Limited, Wiltshire (GB)

(72) Inventors: Jack Cyril Biltcliffe, Bristol (GB); Jake John Read, York (GB); Ben Lowson, Bristol (GB); Christopher David Selway, Bristol (GB)

(73) Assignee: Dyson Technology Limited, Wiltshire (GB)

( * ) Notice: Subject to any disclaimer, the term of this patent is extended or adjusted under 35 U.S.C. 154(b) by 296 days.

(21) Appl. No.: 16/204,717

(22) Filed: Nov. 29, 2018

(65) Prior Publication Data
US 2019/0168151 A1   Jun. 6, 2019

(30) Foreign Application Priority Data

Dec. 1, 2017   (GB) ..................... 1720057

(51) Int. Cl.
*B01D 46/00* (2022.01)
*F04F 5/16* (2006.01)
(Continued)

(52) U.S. Cl.
CPC ....... *B01D 46/0005* (2013.01); *B01D 46/002* (2013.01); *B01D 46/0024* (2013.01);
(Continued)

(58) Field of Classification Search
None
See application file for complete search history.

(56) References Cited

U.S. PATENT DOCUMENTS 1,746,283 A * 2/1930 Reed ..................... B01D 46/10
55/509
2,488,467 A * 11/1949 De Lisio .................. F04F 5/16
239/561
(Continued)

FOREIGN PATENT DOCUMENTS

CN   202203157   4/2012
CN   204082679   1/2015
(Continued)

OTHER PUBLICATIONS

Search Report dated May 30, 2018, directed to GB Application No. 1720057.7; 2 pages.
(Continued)

*Primary Examiner* — Christopher P Jones
*Assistant Examiner* — Brit E. Anbacht
(74) *Attorney, Agent, or Firm* — Faegre Drinker Biddle & Reath LLP

(57) ABSTRACT

There is provided a filter assembly arranged to be mounted over the air inlet of a fan assembly, the filter assembly comprising a filter frame arranged to support one or more filter media. The filter frame is provided with a first engagement member on a first edge of the filter frame and a second engagement member on a second edge of the filter frame, the first edge being opposite to the second edge. The first engagement member and the second engagement member are each configured to be engaged by a respective retention assembly when mounted on the fan assembly.

25 Claims, 11 Drawing Sheets

(51) Int. Cl.
*F04D 29/40* (2006.01)
*F04D 25/08* (2006.01)
*F04D 29/70* (2006.01)
*B01D 46/52* (2006.01)
*B01D 46/10* (2006.01)
*B01D 46/24* (2006.01)

(52) U.S. Cl.
CPC ....... *B01D 46/0026* (2013.01); *B01D 46/103* (2013.01); *B01D 46/2403* (2013.01); *B01D 46/521* (2013.01); *F04D 25/08* (2013.01); *F04D 29/403* (2013.01); *F04D 29/703* (2013.01); *F04F 5/16* (2013.01); *B01D 2273/30* (2013.01)

(56) References Cited

U.S. PATENT DOCUMENTS

| | | | |
|---|---|---|---|
| 3,001,606 A | | 9/1961 | Bierwirth et al. |
| 3,449,891 A | * | 6/1969 | Amelio .................. F02B 61/04 55/306 |
| 3,650,095 A | * | 3/1972 | Welch ................ B01D 46/2403 55/493 |
| 3,945,703 A | * | 3/1976 | McCormick ........... H01R 13/71 439/311 |
| 4,734,874 A | * | 3/1988 | Hwang .................... G06F 1/181 361/679.21 |
| 5,224,974 A | * | 7/1993 | Johnson ................. B05B 14/43 600/453 |
| 5,256,312 A | * | 10/1993 | Letersky ............... B01D 29/05 210/767 |
| 5,679,122 A | | 10/1997 | Moll et al. |
| 5,893,939 A | | 4/1999 | Rakocy et al. |
| 6,174,340 B1 | | 1/2001 | Hodge |
| 6,267,793 B1 | * | 7/2001 | Gomez .................. B01D 46/42 454/187 |
| 6,344,065 B1 | | 2/2002 | Boulva |
| 8,770,946 B2 | * | 7/2014 | Fitton ....................... F04F 5/16 417/198 |
| 8,882,451 B2 | * | 11/2014 | Fitton ....................... F04F 5/16 415/121.2 |
| 8,961,634 B2 | * | 2/2015 | Boyce ................ B01D 46/0087 55/306 |
| 9,914,083 B2 | * | 3/2018 | Rehme ................. B01D 46/103 |
| 2004/0112020 A1 | | 6/2004 | Wilson |
| 2006/0168925 A1 | | 8/2006 | Whittemore |
| 2007/0056229 A1 | * | 3/2007 | Lu .......................... F24F 13/084 52/198 |
| 2010/0000190 A1 | * | 1/2010 | Kidman ................. B01D 46/52 55/502 |
| 2011/0011782 A1 | * | 1/2011 | Myers ................ B01D 46/0002 210/232 |
| 2012/0047855 A1 | * | 3/2012 | Eyers ................... B01D 46/002 55/378 |
| 2012/0103890 A1 | * | 5/2012 | Larsson ................ B01D 33/23 210/236 |
| 2012/0277597 A1 | * | 11/2012 | Eshbaugh ........... A61B 5/02141 600/481 |
| 2013/0092798 A1 | * | 4/2013 | Boyce .................... B01D 46/12 244/53 B |
| 2013/0097979 A1 | * | 4/2013 | Mann ................. B01D 46/0005 55/357 |
| 2014/0000458 A1 | * | 1/2014 | Ferguson ........... B01D 46/0026 95/273 |
| 2015/0198352 A1 | * | 7/2015 | Bruhnke ............... F24F 13/082 292/336.3 |
| 2016/0238039 A1 | * | 8/2016 | Stewart ................. F04D 29/403 |
| 2017/0304758 A1 | * | 10/2017 | Dinakaran ............. B01D 46/10 |

FOREIGN PATENT DOCUMENTS

| | | |
|---|---|---|
| CN | 107588024 | 1/2018 |
| CN | 209530329 U | 10/2019 |
| EP | 2908067 | 8/2015 |
| GB | 2478927 | 9/2011 |
| JP | 58-55630 | 4/1983 |
| JP | 59-16519 | 1/1984 |
| JP | S63-93320 A | 4/1988 |
| JP | 2-140525 | 5/1990 |
| JP | 2003-65565 | 3/2003 |
| JP | 2015-150556 A | 8/2015 |
| WO | 2006/058370 | 6/2006 |
| WO | 2010/046691 | 4/2010 |
| WO | 2010/100451 | 9/2010 |
| WO | 2016/128732 | 8/2016 |

OTHER PUBLICATIONS

International Search Report and Written Opinion dated Jan. 4, 2019, directed to International Application No. PCT/GB2018/052820; 17 pages.
Notification of Reason for Rejection dated Feb. 3, 2020, directed to JP Application No. 2018-224771; 8 pages.
The First Office Action dated Dec. 1, 2020, directed to CN Application No. 201811442934.5; 14 pages.
Liu, "Dictionary of Containerization and Modern Logistics Second Edition", Dalian Maritime University Press, Sep. 30, 2010, pp. 770-771.
Office Action received for Chinese Patent Application No. 201811442934.5, dated Jun. 28, 2021, 17 pages (6 pages of English Translation and 11 pages of Original Document).

* cited by examiner

FILTER ASSEMBLY

REFERENCE TO RELATED APPLICATIONS

This application claims the priority of United Kingdom Application No. 1720057.7, filed Dec. 1, 2017, the entire contents of which are incorporated herein by reference.

FIELD OF THE INVENTION

The present invention relates to filter assembly arranged to be mounted over the air inlet of a fan assembly.

BACKGROUND OF THE INVENTION

A conventional domestic fan typically includes a set of blades or vanes mounted for rotation about an axis, and drive apparatus for rotating the set of blades to generate an airflow. The movement and circulation of the airflow creates a 'wind chill' or breeze and, as a result, the user experiences a cooling effect as heat is dissipated through convection and evaporation. The blades are generally located within a cage which allows an airflow to pass through the housing while preventing users from coming into contact with the rotating blades during use of the fan.

U.S. Pat. No. 2,488,467 describes a fan which does not use caged blades to project air from the fan assembly. Instead, the fan assembly comprises a base which houses a motor-driven impeller for drawing an airflow into the base, and a series of concentric, annular nozzles connected to the base and each comprising an annular outlet located at the front of the nozzle for emitting the airflow from the fan. Each nozzle extends about a bore axis to define a bore about which the nozzle extends.

Each nozzle is in the shape of an airfoil may therefore be considered to have a leading edge located at the rear of the nozzle, a trailing edge located at the front of the nozzle, and a chord line extending between the leading and trailing edges. In U.S. Pat. No. 2,488,467 the chord line of each nozzle is parallel to the bore axis of the nozzles. The air outlet is located on the chord line, and is arranged to emit the airflow in a direction extending away from the nozzle and along the chord line.

Another fan assembly which does not use caged blades to project air from the fan assembly is described in WO 2010/100451. This fan assembly comprises a cylindrical base which also houses a motor-driven impeller for drawing a primary airflow into the base, and a single annular nozzle connected to the base and comprising an annular mouth/outlet through which the primary airflow is emitted from the fan. The nozzle defines an opening through which air in the local environment of the fan assembly is drawn by the primary airflow emitted from the mouth, amplifying the primary airflow. The nozzle includes a Coanda surface over which the mouth is arranged to direct the primary airflow. The Coanda surface extends symmetrically about the central axis of the opening so that the airflow generated by the fan assembly is in the form of an annular jet having a cylindrical or frusto-conical profile.

WO 2010/046691 also describes a fan assembly. The fan assembly comprises a cylindrical base which houses a motor-driven impeller for drawing a primary air flow into the base, and an annular nozzle connected to the base and comprising an annular air outlet through which the primary air flow is emitted from the fan. The fan assembly comprises a filter for removing particulates from the air flow. The filter may be provided upstream from motor-driven impeller, in which case particulates are removed from the air flow prior to passing through the impeller. This protects the impeller from debris and dust that may be drawn into the fan assembly and which may damage the fan assembly. Alternatively, the filter may be provided downstream from the motor-driven impeller. In this configuration it is possible to filter and clean the air drawn through the motor-driven impeller, including any exhaust emissions, prior to progression through the elements of the fan assembly and supply to the user.

WO2016/128732 describes a fan assembly similar to those of WO 2010/100451 and WO 2010/046691. The fan assembly is provided with air inlets that extend around the entire circumference of the body of the fan in order to maximise the area available for air to be drawn into the fan assembly. The fan assembly is therefore also provided with a tubular, barrel-type filter that fits concentrically over the body of the fan and surrounds the entire circumference of the fan body upstream from the air inlets, and a nozzle that is removably mounted on the body. The filter is not connected to either the body or the nozzle but is securely held in place by the nozzle when mounted on the body, and can only be removed from the fan assembly after removal of the nozzle. This arrangement provides that the filter may simply be lowered onto the body before being secured in place by the engagement of the nozzle with the body and further provides that the filter can easily be removed from the body after removal of the nozzle in order to allow for cleaning or replacement of the filter.

SUMMARY OF THE INVENTION

It is an object of the present invention to provide a filter assembly arranged to be mounted over the air inlet of a fan assembly that can be removed (e.g. for cleaning and/or replacement) without the need to remove the nozzle from the fan body, whilst still optimising the area available for air to be drawn into the fan assembly.

To do so, the present invention provides a filter assembly arranged to be mounted over the air inlet of a fan assembly that comprises a pair of engagement members that are provided on opposing edges of the fan assembly and that are each arranged to be engaged by a respective retention assembly when mounted on the fan assembly. Providing the filter assembly with a pair of engagement members allows the filter assembly to be mounted and retained on the body of a fan assembly by the simply sliding the filter assembly sideways onto the fan body so that the engagement members are each engaged by a corresponding retention assembly. The filter assembly can then also be removed from the fan body simply by releasing the engagement members from the retention assemblies and lifting them sideways away from the fan body without the need to remove the nozzle.

By doing away with the need to remove the nozzle in order to remove the filters from the fan assembly, the present invention provides that the nozzle and/or the neck of the nozzle of the fan assembly can incorporate components and/or functionality that could not easily be incorporated into a removable nozzle.

In a first aspect, the present invention provides a filter assembly arranged to be mounted over the air inlet of a fan assembly, the filter assembly comprising a filter frame arranged to support one or more filter media. The filter frame is provided with a first engagement member on a first edge of the filter frame and a second engagement member on a second edge of the filter frame, the first edge being opposite to the second edge. The first engagement member and the second engagement member are each configured to be engaged by a respective retention assembly when mounted on the fan assembly. Preferably, the filter frame has two-fold rotational symmetry such that the filter frame can be retained on the fan assembly in either of two opposing orientations.

Preferably, the first engagement member provided on the first edge of the filter frame is located towards a first end of the filter frame, and the second engagement member provided on the second edge of the filter frame is located towards an opposing, second end of the filter frame. A distance between the first engagement member and the first end of the filter frame may then be equal to a distance between the second engagement member and the second end of the filter frame. The first engagement member may be adjacent to a first corner of the filter frame and the second engagement member may be adjacent to a diagonally opposing second corner of the filter frame.

Preferably, the first engagement member and the second engagement member each comprise a pair of hooks that face in opposing directions. Each hook may comprise a projection extending from the filter frame having a distal end that is angled relative to a proximal end, the distal end extending in a direction that is parallel to the longitudinal axis of the filter frame. Each pair of hooks may comprise a single projection extending from the filter frame having a distal end comprising a pair of angled portions that are parallel to the longitudinal axis of the filter frame and that extend in opposing directions.

Preferably, the filter frame is provided with a first side flange that extends along a first side of the filter frame and a second side flange that extends along a second side of the filter frame. More preferably, the first side flange extends along the entirety of the first side of the filter frame and the second side flange that extends along the entirety of the second side of the filter frame. These side flanges provide surfaces to which the filter media can be sealed using glue on the downstream side of filter assembly and also provide surfaces that allow the filter frame to form a seal with the body of the fan (e.g. with corresponding flanges on the body) to prevent air from leaking into or out of the fan body without passing through the filter media. The first engagement member may then be provided on the first side flange and the second engagement member provided on the second side flange.

The filter frame may be provided with a first end flange that extends along a first end of the filter frame and a second side flange that extends along a second end of the filter frame, the first end flange and the second end flange being arranged to support the one or more filter media. More preferably, the first end flange extends around the entirety of the first end of the filter frame and the second side flange that extends around the entirety of the second end of the filter frame. These end flanges also provide surfaces to which the filter media can be sealed using glue on the downstream side of filter assembly, provide surfaces that allow the filter frame to form a seal with the body of the fan (e.g. with corresponding flanges on the body) to prevent air from leaking into or out of the fan body without passing through the filter media, and also provide support for the filter media provided on the filter frame.

Preferably, the filter frame is provided with a seal that extends around the entirety of an inner/inwardly facing periphery of the filter frame. The filter frame may be provided with a recess that that extends around the entirety of the inner periphery of the filter frame and that is arranged to received and support the seal. The recess may extend across an inner surface of both the first side flange and second side flange, and across an inner edge of both the first end and the second end of the filter frame.

Preferably, the filter assembly further comprises a first retention member provided on a first end of the filter frame and a second retention member provided on an opposing, second end of the filter frame, wherein the first retention member and the second rotation member are arranged to releasably retain a shroud when mounted on the filter assembly. More preferably, the first retention member is provided on the first end flange of the filter frame, and the second retention member is provided on the second end flange of the filter frame.

Each of the first retention member and the second retention member may comprise a resilient catch or hook that is arranged to engage a corresponding through-hole provided on the shroud. The resilient catch or hook comprises a resilient arm or tab, a distal end of the resilient tab being provided with a sloped projection, wherein the sloped projection slopes downwards towards the distal end of the resilient tab. Preferably, the resilient arm or tab extends in a direction that is parallel to a plane that bisects the filter frame and the sloped projection projects/extends away from the exterior/external surface of an end flange of the filter frame.

Preferably, the filter frame is provided with one or more alignment ribs that are arranged to cooperate with a corresponding track or channel or groove provided on the shroud in order to guide the shroud onto the filter frame (i.e. so that each of the shroud retention members engage a respective shroud retention though-hole). Preferably, the or each alignment rib is straight and extends in a direction that is parallel to a longitudinal plane that bisects the filter frame. The or each alignment rib is therefore perpendicular to the longitudinal axis of the filter frame.

The filter frame may be provided with at least one alignment rib on each end of the filter frame. The first end flange and the second end flange of the filter frame may then each be provided with a pair of alignment ribs. The alignment ribs then project/extend away from and extend along the exterior/external surface of the flange. Preferably, a first of the pair of alignment ribs is provided towards a first end of the flange and a second of the pair of alignment ribs is provided towards an opposite, second end of the flange.

Preferably, the first end flange and the second end flange of the filter frame are each provided with a further pair of alignment ribs. Each of the second pair of alignment ribs may be provided on opposite sides of the engagement member provided on the end flange.

Preferably, the filter assembly is substantially semi-cylindrical in shape. The filter assembly may then have the shape of a partial tube that is configured to cover a portion of the periphery/outer surface of the generally cylindrical fan body. The edges of the filter frame may therefore be parallel to the longitudinal axis of the filter frame, with the ends of the filter frame being perpendicular to a longitudinal axis of the of the filter frame and having an arc-shaped cross section in a plane perpendicular to longitudinal axis.

BRIEF DESCRIPTION OF THE DRAWINGS

An embodiment of the present invention will now be described, by way of example only, with reference to the accompanying drawings, in which:

FIG. 1b is a right side view of the fan assembly of FIG. 1a;

FIG. 2 is a right side cross-section view, taken along line A-A in FIG. 1a;

FIG. 5b is a rear perspective view of the filter assembly of FIG. 5a;

FIG. 7b is a rear exploded view of the retention assembly of FIG. 7a;

DETAILED DESCRIPTION OF THE INVENTION

There will now be described a purifying fan assembly comprising one or more filter assemblies and mechanisms for retaining and releasing the filter assemblies that provide several advantages over those of conventional fan assemblies. The term "fan assembly" as used herein refers to a fan assembly configured to generate and deliver an airflow for the purposes of thermal comfort and/or environmental or climate control. Such a fan assembly may be capable of generating one or more of a dehumidified airflow, a humidified airflow, a purified airflow, a filtered airflow, a cooled airflow, and a heated airflow.

The fan assembly comprises a body or stand, a motor-driven impeller contained within the fan body and arranged to generate an airflow, and a nozzle mounted on and supported by the fan body, the nozzle being arranged to receive the airflow from the fan body and to emit the airflow from the fan assembly. The fan body is provided with a pair of air inlets through which air enters the body (i.e. through which air is drawn into the fan body by the motor-driven impeller). Specifically, the fan body is provided with a first air inlet and a second air inlet, the first air inlet and the second air inlet being on opposing halves of the fan body.

The fan assembly then further comprises two separate filter assemblies that each comprise a filter frame supporting one or more filter media and that are each arranged to be mounted on the fan body over a respective one of the air inlets. The filter assemblies are therefore located upstream relative to the air inlets of the fan body. Preferably, the two filter frames are identical and are therefore interchangeable.

The fan assembly is then provided with a pair of retention assemblies that cooperate to releasably retain the two filter assemblies on the fan body. To do so, the fan body comprises a first retention assembly that is configured to releasably engage both a first filter frame adjacent to a first edge of the first filter frame and a second filter frame adjacent to a first edge of the second filter frame, and a second retention assembly that is configured to releasably engage both the first filter frame adjacent to a second edge of the first filter frame and the second filter frame adjacent to a second edge of the second filter frame. The first edge of the first filter frame is opposite to the second edge of the first filter frame, and the first edge of the second filter frame is opposite to the second edge of the second filter frame.

Figure 1A:
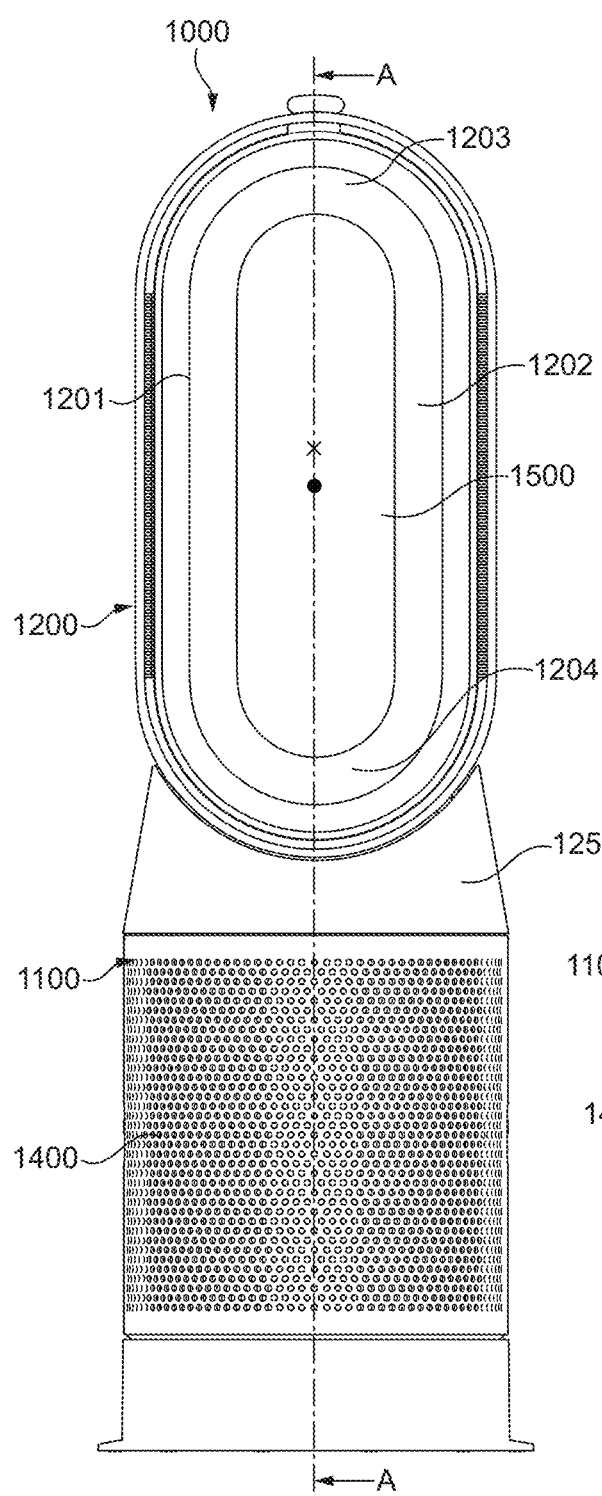
FIG. 1a is a front view of an embodiment of a fan assembly.
Figure 1B:
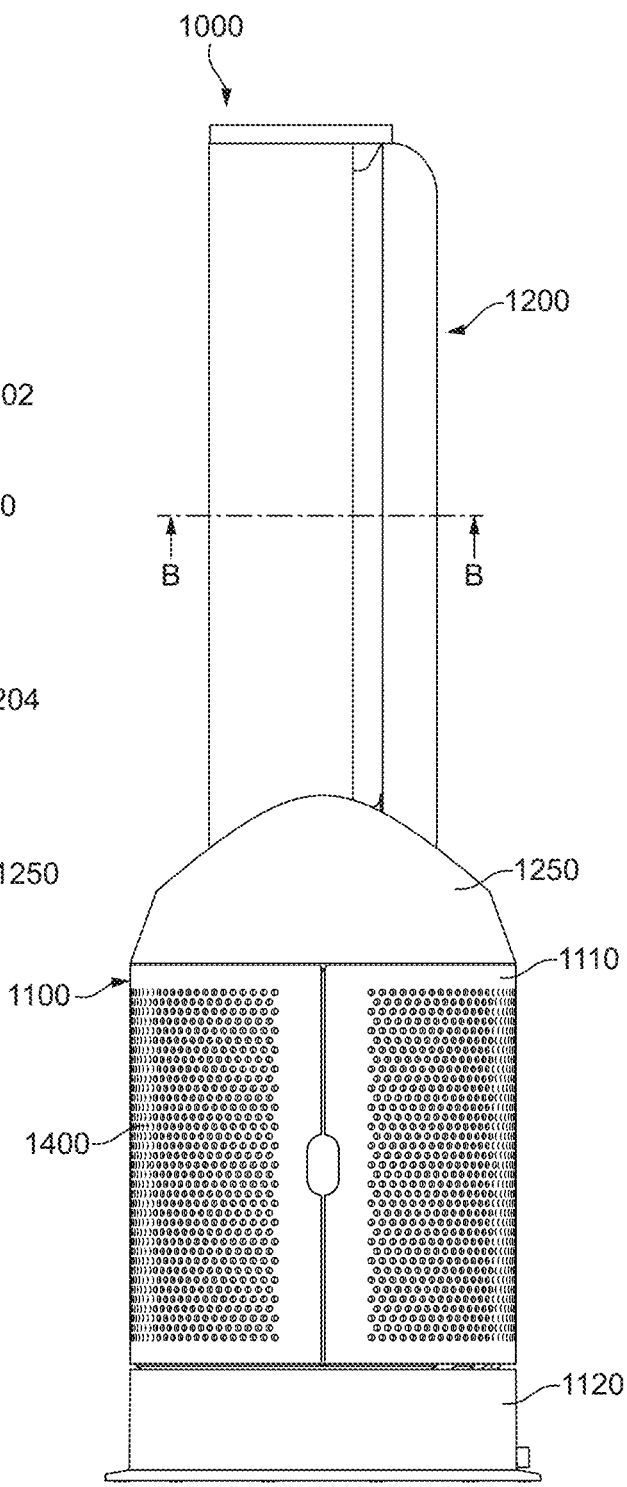
Figure 2:
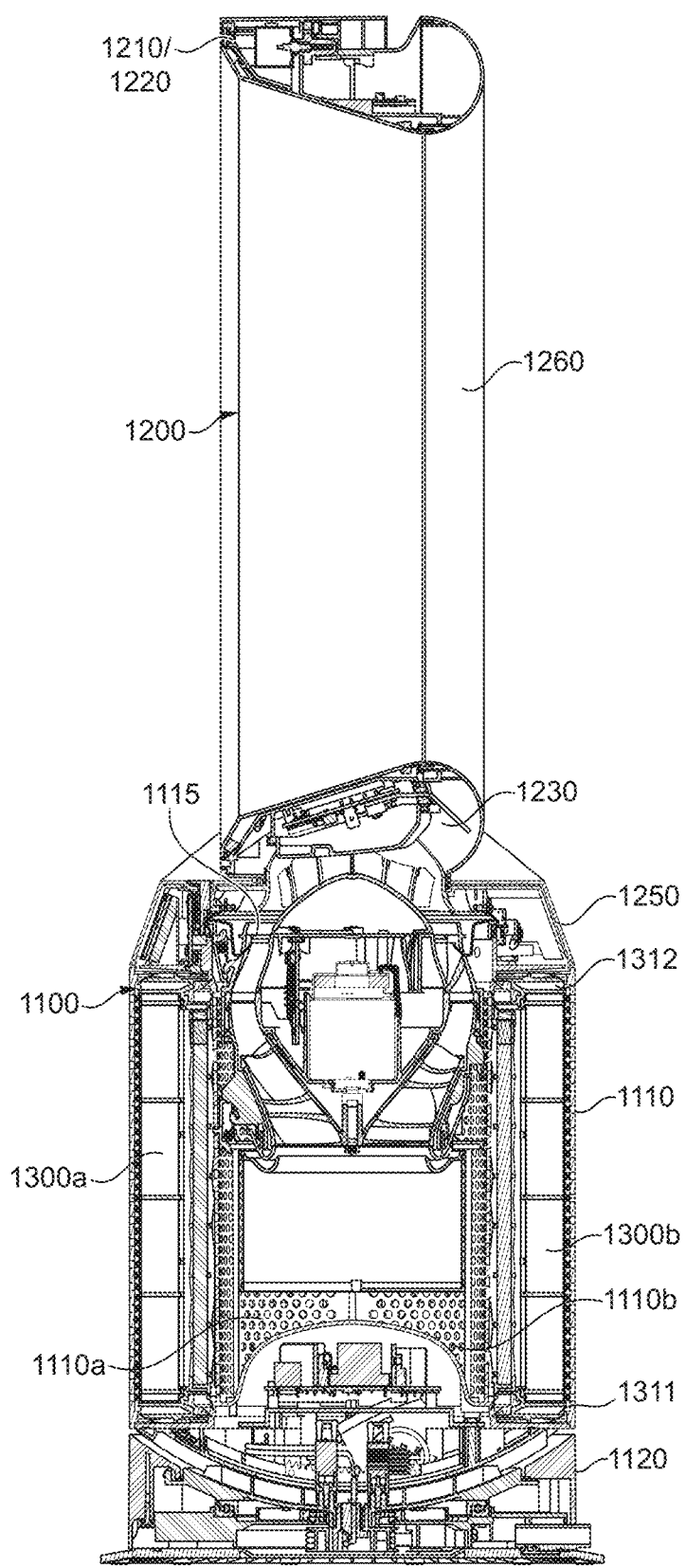
Figure 3:
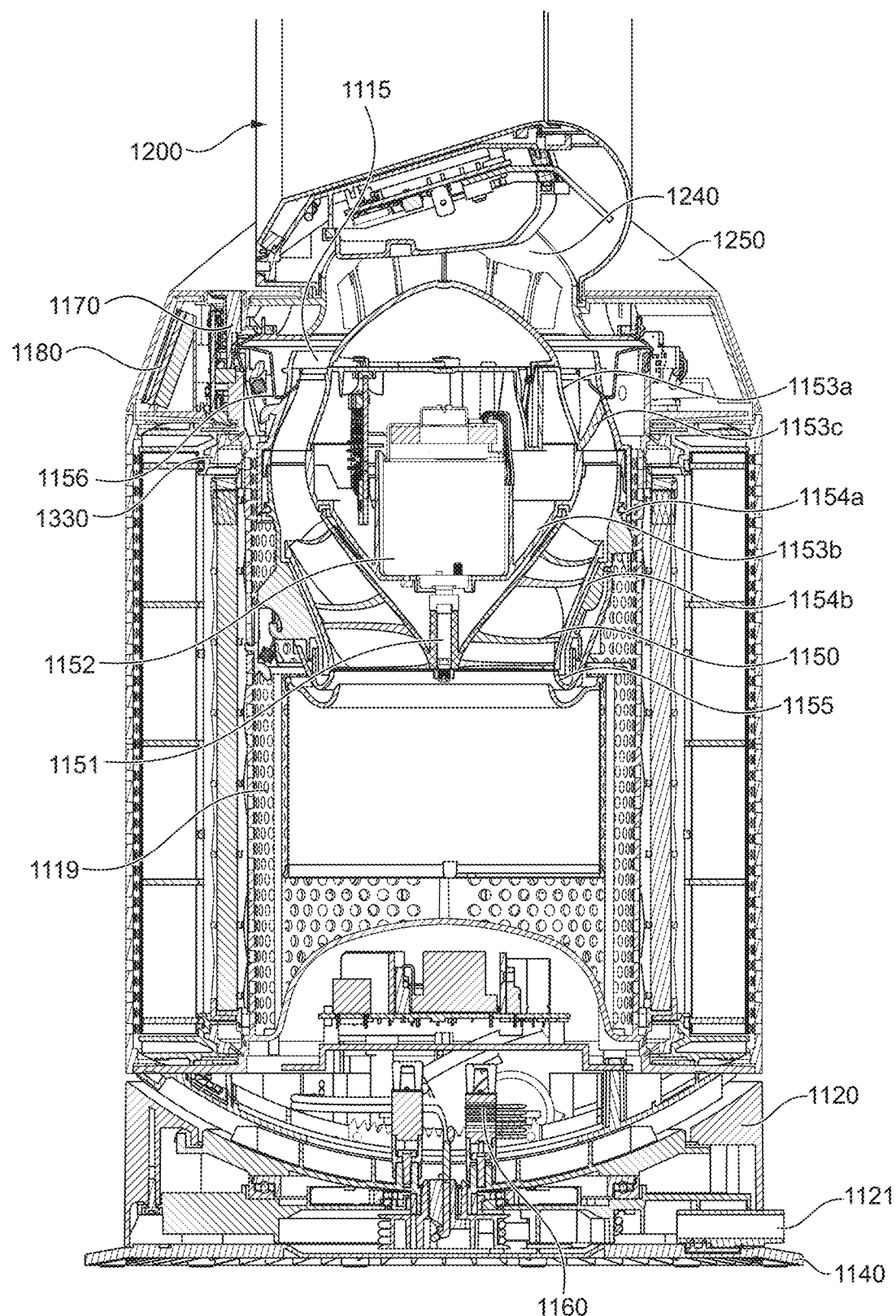
FIG. 3 is an enlarged view of a portion of the cross-section view of FIG. 2.

FIGS. 1a and 1b are external views of an embodiment of a free-standing environmental control fan assembly 1000, and FIG. 2 show a sectional view through lines A-A of FIG. 1a. FIG. 3 then shows an enlarged sectional view of the body 1100 of the fan assembly 1000 illustrated in FIGS. 1a and 1b.

As shown in FIGS. 2 and 3, the body 1100 comprises a substantially cylindrical main body section 1110 mounted on a substantially cylindrical lower body section 1120. The main body section 1110 has a smaller external diameter than the lower body section 1120. The main body section 1110 has a lower annular flange 1111 that extends radially/perpendicularly away from the lower end of the main body section 1110. The outer edge of the lower annular flange 1111 is substantially flush with the external surface of the lower body section 1120. The removable filter assemblies 1300 are then mounted on the main body section 1110, resting on the lower annular flange 1111 of the main body section 1110. In this embodiment, the main body section 1110 further comprises an upper annular flange 1112 that extends radially/perpendicularly away from an opposite, upper end of the main body section 1110. The outer edge of the upper annular flange 1112 is then substantially flush with the external surface of a base/neck 1250 of the nozzle 1200 that connects to upper end of the main body section 1110.

Figure 4:
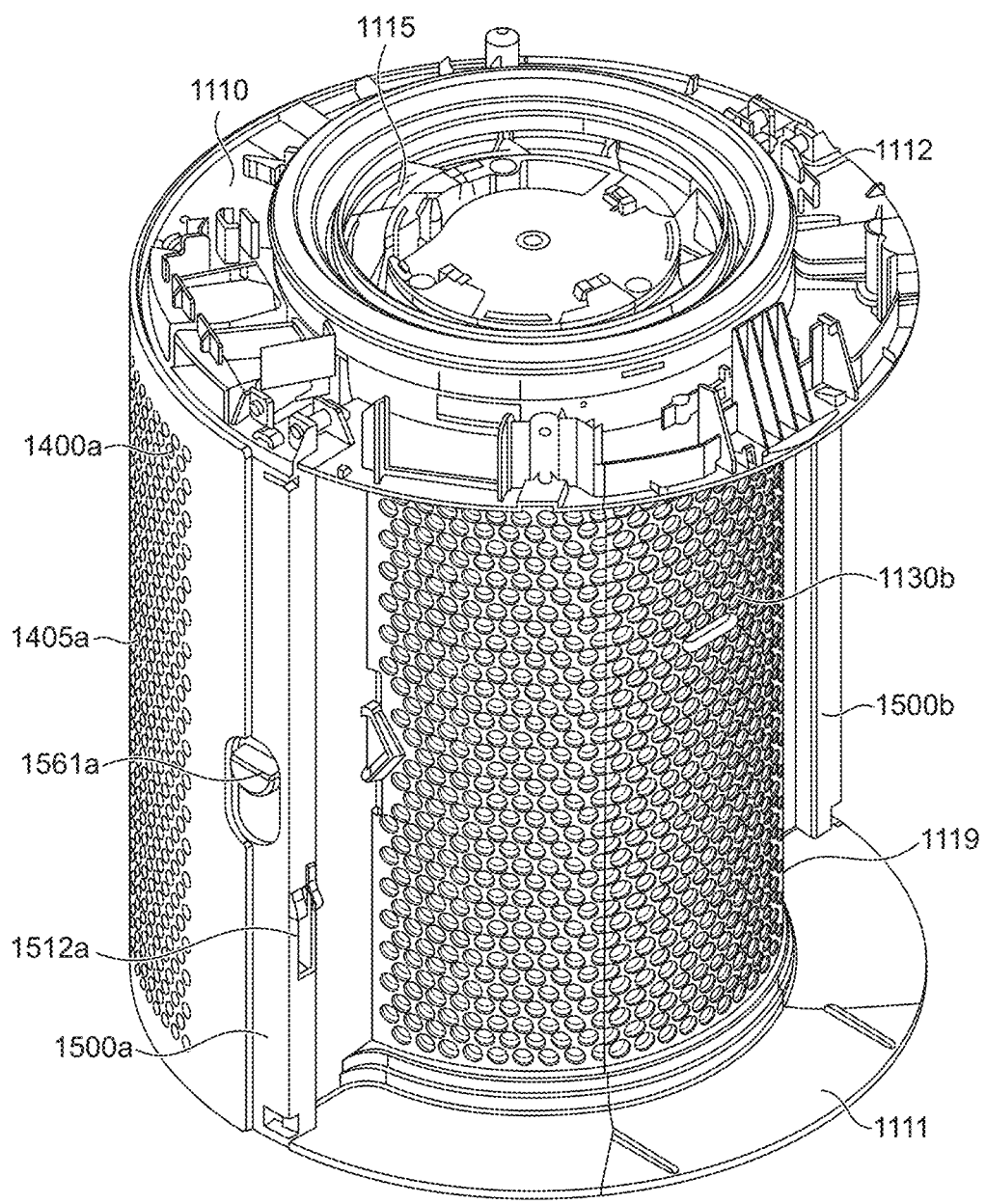
FIG. 4 is a perspective view of a main body section of the fan assembly of FIGS. 1a and 1b.

As shown in FIGS. 3 and 4, the main body section 1110 comprises a perforated cylindrical housing 1119 that contains various components of the fan assembly 1000. The perforated housing 1119 comprises two separate arrays of apertures which act as the air inlets 1130a, 1130b of the body 1100 of the fan assembly 1000. A first air inlet 1130a of the fan assembly 1000 is provided by a first array of apertures provided on a first half/portion of the circular cylindrical housing 1119 that extends over the entire length/height of the main body section 1110, and a second inlet 1130b of the fan assembly 1000 is provided by a second array of apertures provided on a second half/portion of the circular cylindrical housing 1119 that extends over the entire length/height of the main body section 1110. Alternatively, each of the air inlets 1130a, 1130b could comprise one or more grilles or meshes mounted within windows formed in the main body section 1110.

A filter assembly 1300 is then located upstream from each of the air inlets 1130a, 1130b of the main body section 1110, such that the air drawn into the main body section 1110 by the impeller 1150 is filtered prior to entering the main body section 1110. This serves to remove any particles which could potentially cause damage to the fan assembly 1000, and also ensures that the air emitted from the nozzle 1200 is free from particulates. In addition, this also serves to remove various chemical substances from that could potentially be a health hazard so that the air emitted from the nozzle 1200 is purified. The main body section 1110 is open at the upper end thereof to accommodate the air vent/opening 1115 through which the primary airflow is exhausted from the body 1100.

The lower body section 1120 comprises a further housing containing components of the fan assembly 1000 other than those contained within main body section 1110. The lower body section 1120 is mounted on a base 1140 for engaging a surface on which the fan assembly 1000 is located. Specifically, the base 1140 supports the fan assembly 1000 when located on a surface with the nozzle 1200 uppermost relative to the base 1140. In this embodiment, the lower body section 1120 houses a pan drive gear (not shown) that is engaged by a pan pinion (not shown). The pan pinion is driven by an oscillation motor 1160 housed within the bottom of the main body section 1110. Rotation of the pan pinion by the oscillation motor 1160 therefore causes the main body section 1110 to rotate relative to the lower body section 1120. A mains power cable (not shown) for supplying electrical power to the fan assembly 1000 extends through an aperture 1121 formed in the lower body section 1120. The external end of the cable is then connected to a plug for connection to a mains power supply.

The main body section 1110 houses the impeller 1150 for drawing the primary airflow through the air inlets 1130a, 1130b and into the body 1100. Preferably, the impeller 1150 is in the form of a mixed flow impeller. The impeller 1150 is connected to a rotary shaft 1151 extending outwardly from a motor 1152. In the embodiment illustrated in FIGS. 2 and 3, the motor 1152 is a DC brushless motor having a speed which is variable by a main control circuit 1170 in response to control inputs provided by a user. The motor 1152 is housed within a motor bucket 1153 that comprises an upper portion 1153a connected to a lower portion 1153b. The upper portion 1153a of the motor bucket further comprises a diffuser 1153c in the form of an annular disc having curved blades.

The motor bucket 1153 is located within, and mounted on, an impeller housing 1154 that is mounted within the main body section 1110. The impeller housing 1154 comprises a generally frusto-conical impeller wall 1154a and an impeller shroud 1154b located within the impeller wall 1154a. The impeller 1150, impeller wall 1154a and an impeller shroud 1154b are shaped so that the impeller 1150 is in close proximity to, but does not contact, the inner surface of the impeller shroud 1154b. A substantially annular inlet member 1155 is then connected to the bottom of the impeller housing 1154 for guiding the primary airflow into the impeller housing 1154.

In the embodiment illustrated in FIGS. 2 and 3, the air vent/opening 1115 through which the primary airflow is exhausted from the body 1100 is defined by the upper portion of the motor bucket 1153a and the impeller wall 1154a. A flexible sealing member 1156 is then attached between the impeller housing 1154 and the main body section 1120. The flexible sealing member 1156 prevents air from passing around the outer surface of the impeller housing 1154 to the inlet member 1155. The sealing member 1156 preferably comprises an annular lip seal, preferably formed from rubber.

The nozzle 1200 is mounted on the upper end of the main body section 1110 over the air vent 1115 through which the primary airflow exits the body 1100. The nozzle 1200 comprises a neck/base 1250 that connects to upper end of the main body section 1110, and has an open lower end which provides an air inlet 1240 for receiving the primary airflow from the body 1100. The external surface of the base 1250 of the nozzle 1200 is then substantially flush with the outer edge of the upper annular flange 1112 of the main body section 1110. The base 1250 therefore comprises a housing that covers/encloses any components of the fan assembly 1000 that are provided on the upper surface 1112 of the main body section 1110.

In the embodiment illustrated in FIGS. 2 and 3, the main control circuit 1170 is mounted on the upper surface of the upper annular flange 1112 that extends radially away from the upper end of the main body section 1110. The main control circuit 1170 is therefore housed within base 1250 of the nozzle 1200. In addition, an electronic display 1180 is also mounted on the upper annular flange 1112 of the main body section 1110 and therefore housed within base 1250 of the nozzle 1200, with the display 1180 being visible through an opening or at least partially transparent window provided in the base 1250. Optionally, one or more additional electronic components may be mounted on the upper surface of the upper annular flange 1112 and consequentially housed within base 1250 of the nozzle 1200. For example, these additional electronic components may one or more wireless communication modules, such as Wi-Fi, Bluetooth etc., and one or more sensors, such as an infrared sensor, a dust sensor etc., and any associated electronics. Any such additional electronic components would then also be connected to the main control circuit 1170.

The nozzle 1200 comprises an interior passage 1230 for conveying air from the air inlet 1240 of the nozzle 1200 to at least one air outlet 1210 of the nozzle 1200. The nozzle 1200 therefore comprises one or more casing sections 1260 that define the interior passage 1230. These casing sections 1260 also define or are provided with at least one slot 1220 that forms an air outlet 1210 of the nozzle 1200. The airflow drawn through the fan assembly 1000 by the motor-driven impeller 1150 and emitted from the air outlet 1210 of the fan assembly 1000 is referred to hereafter as a primary airflow. The nozzle 1200 also defines a central/inner opening/bore 1500. The nozzle 1200 therefore forms a loop that extends around and surrounds the bore 1500. Any portion of the primary airflow that is emitted from the air outlet 1210 entrains air from outside the fan assembly 1000 so that it is drawn through the bore 1500, with this entrained air being referred to herein as a secondary airflow. The primary airflow therefore combines with the entrained secondary airflow to form a combined, or amplified, airflow projected forward from the front of the nozzle. The nozzle 1200 therefore acts as an air amplifier to supply both the primary airflow and the entrained secondary airflow to the user.

In the embodiment illustrated in FIGS. 1a, 1b and 2, the nozzle 1200 has an elongate annular shape, often referred to as a stadium shape, and defines an elongate opening 1500 having a height greater than its width. The nozzle 1200 therefore comprises two relatively straight sections 1201, 1202 each adjacent a respective elongate side of the opening 1500, an upper curved section 1203 joining the upper ends of the straight sections 1201, 1202, and a lower curved section 1204 joining the lower ends of the straight sections 1201, 1202.

As described above, the fan assembly 1000 comprises two separate filter assemblies 1300a, 1300b that are each configured to be located on and cover one of the air inlets 1130a, 1130b that are provided on the opposing halves of the main body section 1110. Each filter assembly 1300 therefore substantially has the shape of a semi-cylinder/tube that can therefore be located concentrically over the main body section 1110, resting on the lower annular flange 1111 of the main body section 1110. In other words, each filter assembly 1300 has the shape of a partial tube that is configured to cover a portion of the periphery/outer surface of the generally cylindrical main body section 1110. Accordingly, FIG. 4 shows a perspective view of the main body section 1110 of the fan assembly 1000, with one of the filter assemblies 1300b removed and with the other of the filter assemblies 1300a mounted on the far side of the main body section 1110 with a perforated shroud 1400a attached to the outer surface of the filter assembly 1300a.

Figure 5A:
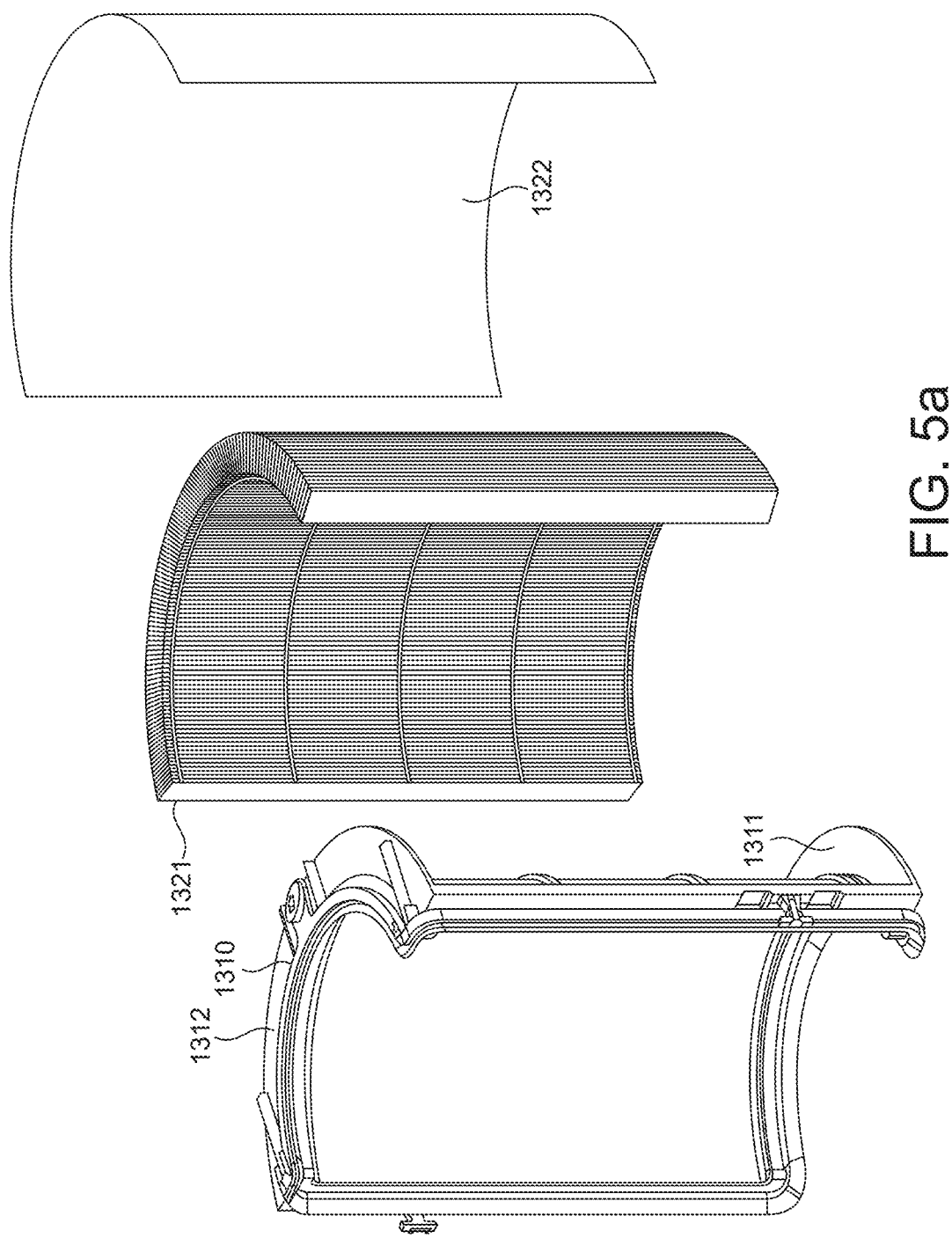
FIG. 5a is an exploded view of the filter assembly of the fan assembly of FIGS. 1a and 1b.

FIG. 5a illustrates an exploded view of an embodiment of a filter assembly 1300 suitable for use with the fan assembly of FIGS. 1 to 4. In this embodiment, each filter assembly 1300 comprises a filter frame 1310 that supports one or more filter media. In the embodiment illustrated in FIG. 5a, each filter frame 1310 substantially has the shape of a semi-cylinder with two straight sides that are parallel to the longitudinal axis of the filter frame 1310 and two curved ends that are perpendicular to the longitudinal axis of the filter frame 1310. The one or more filter media are arranged so as to cover the surface area defined by the filter frame 1310.

The filter frame 1310 is provided with a first end flange 1311 that extends radially/perpendicularly away from a first curved end of the filter frame 1310 and a second end flange 1312 that extends radially/perpendicularly away from an opposite, second curved end of the filter frame 1310. Each filter frame 1310 is then also provided with a first side flange 1313 that extends perpendicularly away from a first side of the filter frame 1310, from a first end of the first end flange 1311 to a first end of the second end flange 1312, and a second side flange 1314 that extends perpendicularly away from a second side of the filter frame 1310, from a second end of the first end flange 1311 to a second end of the second end flange 1312. The first end flange 1311, second end flange 1312, first side flange 1313 and second side flange 1314 are integrally formed with one another to thereby form a ridge or rim that extends around the entire periphery of the filter frame 1310. The flanges 1311-1314 provide surfaces to which the filter media can be sealed (e.g. using glue on the downstream side of filter assembly 1310) and also provide surfaces that allow the filter frame 1310 to form a seal with the main body 1110 of the fan assembly 1000 (e.g. with corresponding flanges on the main body section 1110) to prevent air from leaking into or out of the fan body 1100 without passing through the filter media.

Figure 5B:
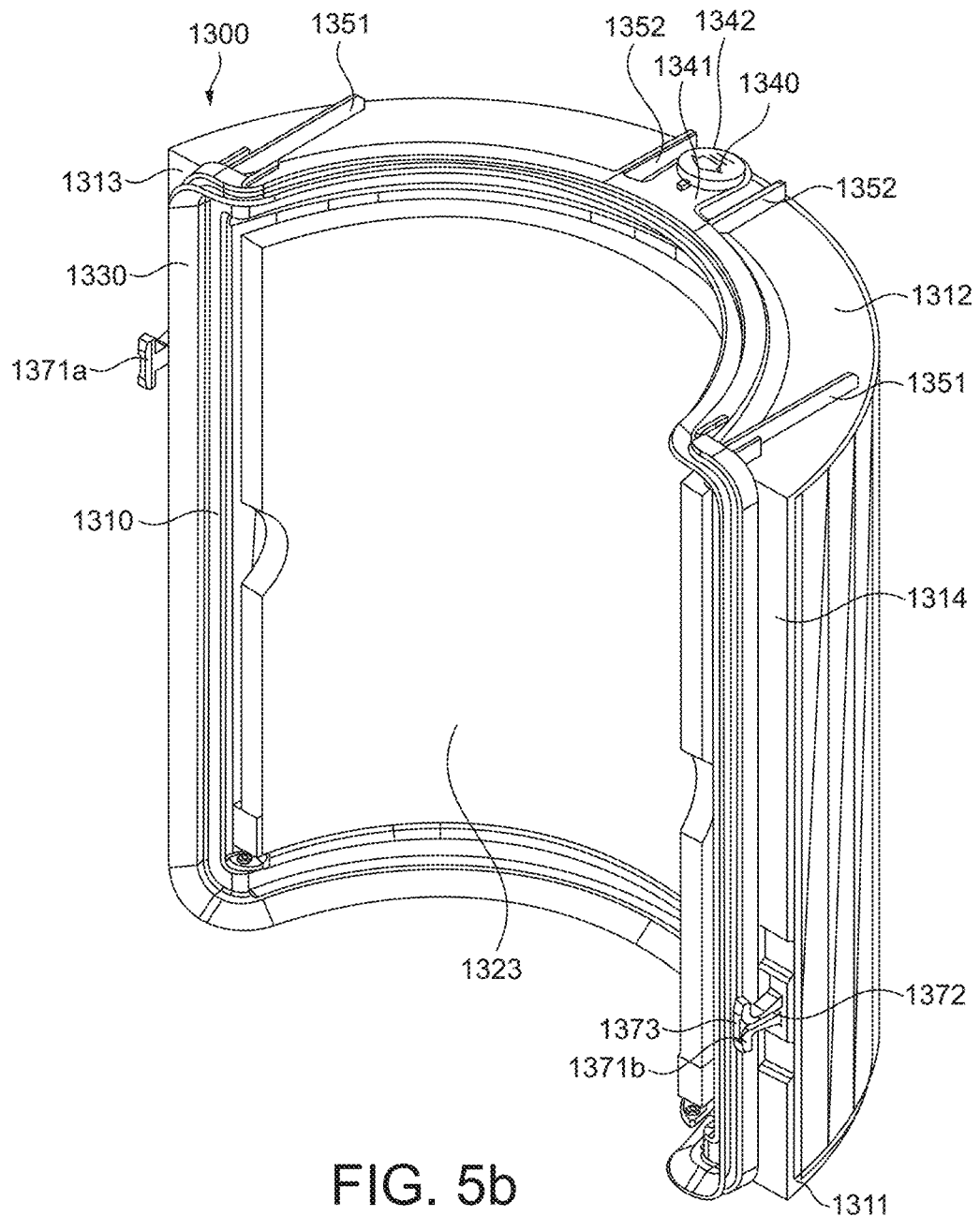

Each filter assembly 1300 further comprises a flexible seal 1330 provided around the entirety of an inner periphery of the filter frame 1310 for engaging with the main body section 1110 to prevent air from passing around the edges of the filter assembly 1300 to the air inlet 1110 of the main body section 1120, as illustrated in FIG. 5b. The flexible filter seal 1330 preferably comprises lower and upper curved seal sections that substantially take the form of an arc-shaped wiper or lip seal, with the each end of the lower seal section being connected to a corresponding end of the upper seal section by two straight seal sections that each substantially take the form of a wiper or lip seal. The upper and lower curved seal sections are therefore arranged to contact the curved upper and lower ends of the main body section 1110, whilst the straight seal sections are arranged to contact one or other of two diametrically opposed, longitudinal flanges 1113, 1114 that extend perpendicularly away from the main body section 1110. Preferably, the filter frame 1310 is provided with a recess (not shown) that extends around the entirety of the inner periphery of the filter frame 1310 and that is arranged to receive and support the seal 1330. In the illustrated embodiment, this recess extends across an inner surface of both the first side flange 1313 and second side flange 1314, and across an inner edge of both the first end and the second end of the filter frame 1310.

One or more filter media 1321, 1322 are then supported on the outer, convex face of the filter frame 1310, extending across the area between the first and second flanges 1311, 1312 and the first second side flanges 1313, 1314. In the illustrated embodiment, each filter assembly 1300a, 1300b comprises a particulate filter media layer 1321 covered with an outer mesh layer 1322 attached on the outer face of the filter frame 1310. Optionally, one or more further filter media 1323 can then be located within the inner, concave face of the filter frame 1310. For example, these further filter media could comprise a first chemical filter media layer covered by a second chemical filter media layer that are both located within the inner face of the filter frame 1210. These further filter media 1323 could either be attached to and/or support on the inner, concave face of the filter frame 1310 or alternatively could be mounted on to the main body section 1110, resting on the lower annular flange 1111 of the main body section 1110 beneath each filter assembly 1300a, 1300b. In either case, the filter frame 1310 will be formed so that it defines a space within the inner, concave face of the filter frame 1310 within which these further filter media 1323 can be accommodated when the filter assembly 1300 is mounted onto the main body section 1110.

Figure 6:
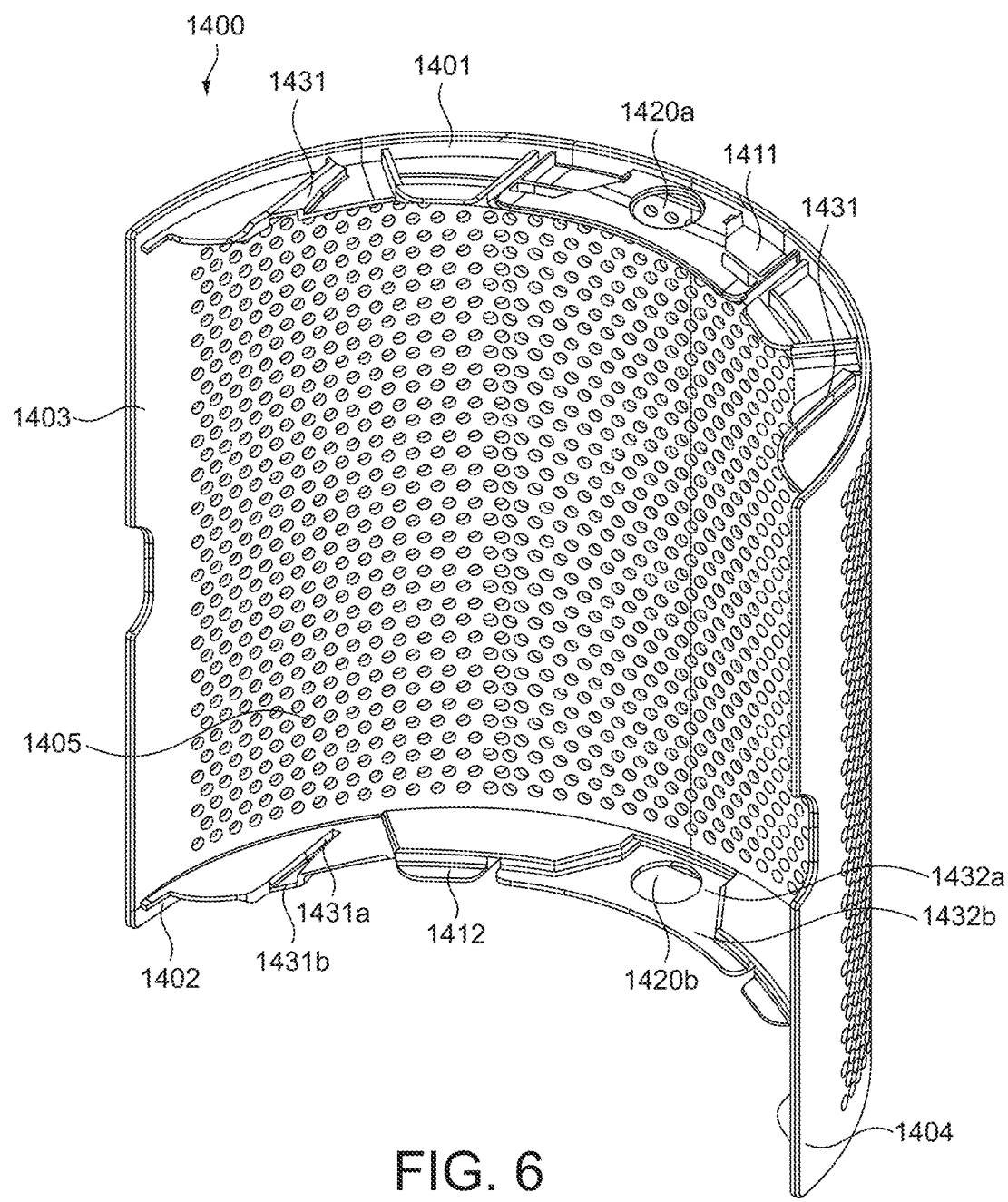
FIG. 6 is a rear perspective view of a perforated shroud of the fan assembly of FIGS. 1a and 1b.

As illustrated in FIG. 4, a perforated shroud 1400 is then releasably attached concentrically to the filter frame 1310 so as to cover the filter assembly 1300 when located on the main body section 1110. FIG. 6 shows a perspective view of such a perforated shroud 1400 that is substantially in the shape of a semi-cylinder. The perforated shroud 1400 therefore has two curved ends 1401, 1402 that are perpendicular to the longitudinal axis of the perforated shroud 1400 and two straight edges 1403, 1404 that are parallel to the longitudinal axis of the perforated shroud 1400. The perforated shrouds 1400 each comprise an array of apertures which provide an air inlet 1405 through the shroud 1400. Alternatively, the air inlet 1405 of the shroud 1400 may comprise one or more grilles or meshes mounted within windows in the shroud 1400. It will also be clear that alternative patterns of air inlet arrays are envisaged within the scope of the present invention. When mounted on filter fame, the shrouds 1400 protect the filter media 1321-1324 from damage, for example during transit, and also provide a visually appealing outer surface covering the filter assemblies 1300, which is in keeping with the overall appearance of the fan assembly 1000. The array of apertures that define the air inlet 1405 of the shroud 1400 are sized to prevent larger particles from passing through to the filter assembly 1300 and blocking, or otherwise damaging, the filter media 1321-1324.

In order to releasably attach each perforated shroud 1400 to a respective filter frame 1310, the perforated shroud is provided with a first end flange 1411 that extends radially/perpendicularly away from the first curved end 1401 of the perforated shroud 1400 and a second end flange 1412 that extends radially/perpendicularly away from the opposite, second curved end 1402 of the perforated shroud 1400. The first end flange 1411 and second end flange 1412 of the perforated shroud 1400 are arranged to slide over the end flanges 1311, 1312 of the filter frame 1310 so that the perforated shroud 1400 is supported on the filter frame 1310. The first end flange 1411 and second end flange 1412 of the perforated shroud 1400 are then each formed with a through-hole 1420a, 1420b that is arranged to be releasably engaged by a corresponding shroud retention member 1340a, 1340b provided on the end flanges of the filter frame 1310.

As illustrated in FIG. 5b, a first shroud retention member 1340a is provided on the first end flange 1311 of the filter frame 1310 and a second shroud retention member 1340b provided on the opposing, second end flange 1312 of the filter frame 1310. The first shroud retention member 1340a and the second shroud retention member 1340b each comprise a resilient catch or hook that is arranged to engage a corresponding through-hole 1420a, 1420b provided on the shroud 1400. The resilient catch or hook provided on each end flange 1311, 1312 of the filter frame 1310 comprises a resilient arm/tab 1341 that extends in a direction that is parallel to a plane that bisects the filter frame 1310. A distal end of the resilient arm/tab 1341 is then provided with a sloped projection 1342 that projects/extends away from the exterior/external surface of the flange 1311, 1312 and slopes downwards towards the distal end of the resilient arm/tab 1341.

When the shroud 1400 is slid onto the filter frame 1310, the sloped projection 1342 contacts an end flange 1311, 1312 of the shroud 1400 thereby forcing the resilient arm/tab 1341 to bend/flex downwards. The sloped projection 1342 then enters the through-hole 1420*a*, 1420*b* provided on the end flange 1411, 1412 of the shroud 1400 when the shroud 1400 is far enough over the filter frame 1310 such that the resilient arm/tab 1341 is then free to return to its original unbent configuration, with the sloped projection 1342 extending through the through-hole 1420*a*, 1420*b*. When a user wishes to separate the shroud 1400 from the filter frame 1310, they apply a downward force onto each sloped projection 1342 and simultaneously begin to slide the shroud 1400 away from the filter frame 1310. The downward force causes the resilient arm/tab 1341 to bend/flex downwards and out of engagement with the through-hole 1420*a*, 1420*b* such that the shroud 1400 is then free to slide off the filter frame 1310.

In order to assist with the mounting of the shroud 1400 onto the filter frame 1310, both the first end flange 1311 and second end flange 1312 of the filter frame 1310 are formed with alignment ribs 1351, 1352 that are each arranged to cooperate with a corresponding track or channel or groove 1431, 1432 provided on the shroud 1400 in order to guide the shroud 1400 onto the filter frame 1300 such that each of the shroud retention members 1340 engages a respective shroud retention though-hole 1420*a*, 1420*b*. Each alignment rib 1351, 1352 is straight and extends in a direction that is parallel to a longitudinal plane that bisects the filter frame 1310 (i.e. parallel to the direction in which the shroud 1400 will be slid on and off the filter frame 1310) and is therefore perpendicular to the longitudinal axis of the filter frame 1310.

In the illustrated embodiment, both the first end flange 1311 and second end flange 1312 of the filter frame 1310 are formed with a first pair of alignment ribs 1351 that project/extend away from and extend along the exterior/external surface of the flange 1311, 1312, with a first of the pair of alignment ribs 1351 being provided adjacent to the first side of the flange and a second of the pair of alignment ribs 1351 being provided adjacent to the second side of the flange. The shroud 1400 is then formed with a pair of corresponding grooves or channels 1431, with each of the pair of grooves or channels corresponding to one of the first pair of alignment ribs 1351. These grooves or channels 1431 taper outwardly from an inner end 1431*a* to a mouth 1431*b* through which one of first pair of the alignment ribs 1351 can enter (i.e. slide into) the groove/channel 1431. The mouth 1431*b* is therefore larger than the inner end 1431*a* of the channel 1431, thereby making it easier to align each rib 1351 with the mouth 1431*b* of the corresponding channel/groove 1431, with the tapering of the groove/channel 1431 then guiding the rib 1351 towards the inner end 1431*a* and a position in which the shroud 1400 is aligned so that the through-holes 1420*a*, 1420*b* will be engaged by the shroud retention member 1340 provided on the corresponding flange 1311, 1312 of the filter frame 1310.

Both the first end flange 1311 and second end flange 1312 of the filter frame 1310 are also formed with a second pair of alignment ribs 1352 that project/extend away from and extend along the exterior/external surface of the flange 1311, 1312, with each of the second pair of alignment ribs 1352 being provided on opposite sides of the shroud retention member 1340 provided on the flange 1311, 1312. The shroud 1400 is then formed with one further groove or channel 1432 that extends into the inner surface of the shroud flange 1411, 1412 around the through-hole 1420. This further groove or channel 1432 also tapers outwardly from an inner end 1432*a* to a mouth 1432*b* through which both of the second pair of alignment ribs 1352 can enter (i.e. slide into) the groove/channel 1432. The mouth 1432*b* is therefore larger than the inner end 1432*a* of the channel 1432 thereby making it easier to align the second pair of alignment ribs 1352 with the mouth 1432*b* of the further channel/groove 1432, with the tapering of the further groove/channel 1432 then guiding the second pair of alignment ribs 1352 towards the inner end 1432*a* and the position in which the shroud 1400 is aligned so that the through-holes 1420*a*, 1420*b* will be engaged by the shroud retention member 1340 provided on the corresponding flange 1311, 1312 of the filter frame 1310.

As shown in FIG. 5*b*, each filter frame 1310 is provided with two engagement members 1371*a*, 1371*b*. A first engagement member 1371*a* is provided on the first edge 1313 of the filter frame 1310 and a second engagement member 1371*b* on the opposing, second edge 1314 of the filter frame 1310, the first engagement member 1371*a* being configured to be engaged by the first retention assembly 1500*a* and the second engagement member 1371*b* being configured to be engaged by the second retention assembly 1500*b*. Specifically, the first edge 1313 of the filter frame 1310 is that provided on a first of the straight sides of the filter frame 1310 whilst the second edge 1314 of the filter frame 1310 is that provided on a second of the straight sides of the filter frame 1310, with these two straight sides being parallel to the longitudinal axis of the filter frame 1310. The first engagement member 1371*a* and the second engagement member 1371*b* therefore project perpendicularly away from the straight sides of the filter frame 1310.

In the illustrated embodiment, the first engagement member 1371*a* provided on the first edge 1313 of the filter frame 1310 is located towards a first end 1311 of the filter frame 1310, and the second engagement member 1371*b* provided on the second edge 1314 of the filter frame 1310 is located towards an opposing, second end 1312 of the filter frame 1310. The distance between the first engagement member 1371*a* and the first end 1311 of the filter frame 1310 is equal to the distance between the second engagement member 1371*b* and the second end 1312 of the filter frame 1310. The first engagement member 1371*a* is therefore adjacent to a first corner of the filter frame 1310 and the second engagement member 1371*b* is adjacent to a diagonally opposing second corner of the filter frame 1310. Specifically, as the filter frame 1310 substantially has the shape of a semi-cylinder, the first engagement member 1371*a* of the filter frame 1310 is located on a first straight edge of the filter frame 1310 towards the top curved end of the filter frame 1310, whilst the second engagement member 1371*b* of the filter frame 1310 is located on a second straight edge of the filter frame 1310 towards the bottom curved end of the filter frame 1310.

The first engagement member 1371*a* and the second engagement member 1371*b* are each configured to be engaged by a retention assembly 1500 of the fan assembly 1000 when the filter frame 1310 is mounted on the fan assembly 1000. In the illustrated embodiment, the first and second engagement members 1371*a*, 1371*b* each comprise a pair of hooks that face in opposing directions. Each hook comprises a projection 1372 extending from the filter frame that has a distal end 1373 that is angled relative to a proximal end, with the distal end 1373 extending in a direction that is parallel to the longitudinal axis of the filter frame 1310. In particular, each pair of hooks comprises a single projection 1372 extending from the filter frame 1310 that has a distal end 1373 comprising a pair of angled portions that are parallel to the longitudinal axis of the filter frame 1310 and that extend in opposing directions. In other words, the first and second engagement members 1371a, 1371b each comprise a generally T-shaped projection that extends from a horizontal edge of the filter frame 1310, with the pair of hooks being provided by the distal end of the T-shaped projection. The first and second engagement members 1371a, 1371b therefore each have two-fold rotational symmetry.

The filter frame 1310 as a whole therefore has two-fold rotational symmetry such that the filter frame 1310 can be mounted on the fan assembly 1000 irrespective of which of the curved ends of the filter frame 1310 is located at the top (i.e. in either of two opposing orientations). Furthermore, the two filter frames 1310a, 1310b mounted on the fan assembly 1000 are identical and are therefore interchangeable.

In order to retain the filter assemblies 1300a, 1300b on the main body section 1110, the fan assembly 1000 comprises a pair of retention assemblies 1500a, 1500b that cooperate to releasably retain the two filter assemblies 1300a, 1300b on the fan body 1100. To do so, each retention assembly 1500 is configured to engage with one or more of the engagement members 1371 provided on the filter frame 1310 when the filter frame 1310 is mounted on the fan assembly 1000. Each retention assembly 1500 then further comprises a release mechanism 1560 that is arranged to cause the retention assembly 1500 to release the filter assembly 1300 when operated by a user.

In the illustrated embodiment, the fan assembly 1000 comprises two retention assemblies 1500a, 1500b that each mounted/attached to the outer surface of the main body section 1110 so that they extend longitudinally along the outer surface of the main body section 1110, with the retention assemblies 1500a, 1500b being diametrically opposed to one another. In other words, the two retention assemblies 1500a, 1500b are located opposite one another on the main body section 1110 such that a plane passing through a longitudinal axis of the first retention assembly 1500a and a longitudinal axis of the second retention assembly 1500b bisects the main body section 1110. The retention assemblies 1500a, 1500b are therefore separated by 180 degrees. The outer surface of the main body section 1110 is therefore divided into two separate halves by the two separate retention assemblies 1500a, 1500b. The first air inlet 1130a and the second air inlet 1130b therefore extend around a periphery of the fan body 1100, except for the locations of the retention assemblies 1500a, 1500b, and respectively cover the entirety of the area between the first retention assembly 1500a and the second filter assembly 1500b.

The first retention assembly 1500a is configured to releasably engage the first filter frame 1310a adjacent to a first straight edge of the first filter frame 1310a and the second retention assembly 1500b is configured to releasably engage the first filter frame 1310a adjacent to an opposing, second straight edge of the first filter frame 1310a. In order to minimise the surface area consumed by the retention assemblies, the first retention assembly 1500a is configured to also releasably engage the second filter frame 1310b adjacent to a first straight edge of the second filter frame 1310b and the second retention assembly 1500b is configured to also releasably engage the second filter frame 1310b adjacent to an opposing, second straight edge of the second filter frame 1310b. The two retention assemblies 1500a, 1500b therefore cooperate to retain both the first filter frame 1310a and the second filter frame 1310b on the main body section 1110 by each engaging opposite edges of the two filter frames 1310a, 1310b. The release mechanisms 1560 of each of the first retention assembly 1500a and the second retention assembly 1500b are therefore arranged to cause the respective retention assembly 1500 to simultaneously release the two filter frames 1310a, 1310b when operated by a user.

Figure 7A:
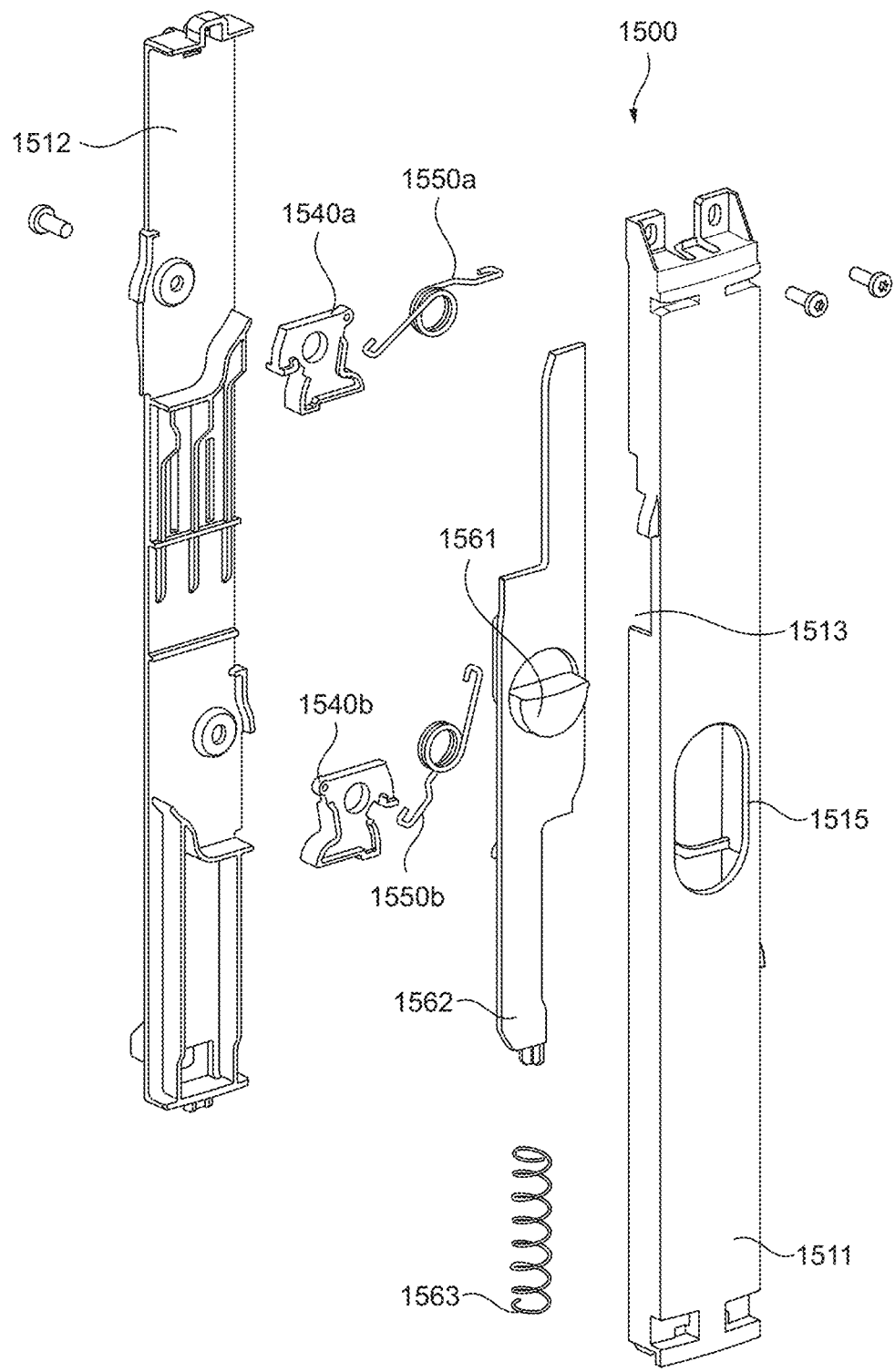
FIG. 7a is a front exploded view of a retention assembly of the fan assembly of FIGS. 1a and 1b.
Figure 7B:
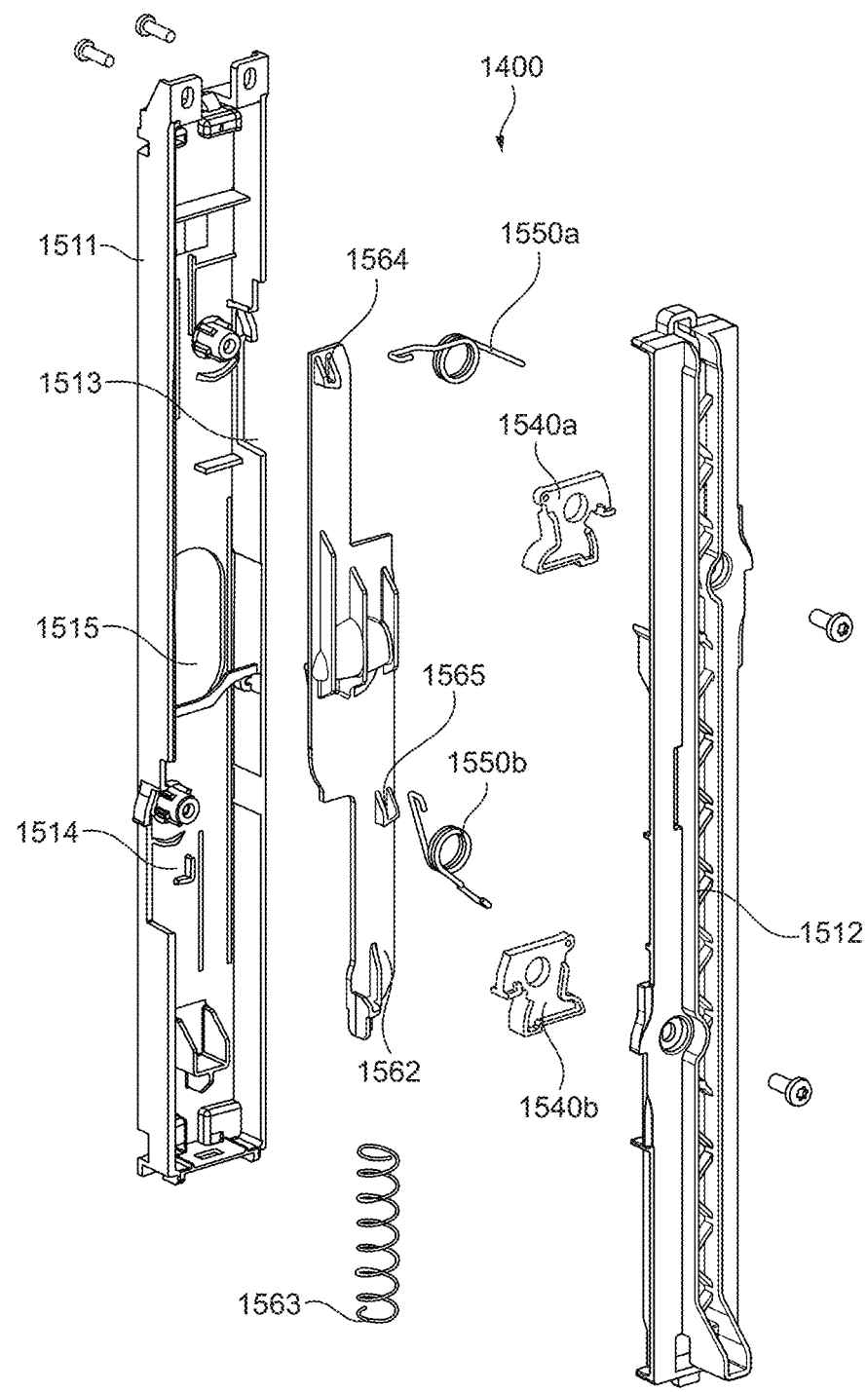

FIG. 7a shows a front exploded view of a retention assembly 1500 and FIG. 7b shows a rear exploded view of a retention assembly 1500. In the embodiment illustrated in FIGS. 7a and 6b, each of the retention assemblies 1500 comprises a housing 1510 that is formed from a first housing section 1511 and a second housing section 1512 that are connected together. The first housing section 1511 is provided with two catch openings 1513, 1514 one in each of the opposing longitudinal sides of the first housing section 1511 and with each being located towards opposite ends of the housing 1510. The distance between the first opening 1513 and a first end of the housing 1500 is equal to the distance between the second opening 1514 and a second end of the housing 1500.

The retention assemblies 1500 each further comprise two bistable catches 1520 mounted within the housing 1510 and that are each aligned with a corresponding one of the catch openings 1513, 1514. The two bistable catches 1520a, 1520b are therefore disposed one above the other within the housing 1510 such that they are at different locations along the longitudinal axis of the housing 1510 of the retention assembly 1500 (i.e. towards opposite ends of the housing 1510) and face in opposing directions. As illustrated in FIG. 4, the housings 1510 of each of the retention assemblies 1500 are then mounted longitudinally along the outer surface of the main body section 1110. The upper bistable catch 1520a can therefore engage with the first engagement member 1371a provided on a first edge of a first of the two filter assemblies 1300a, whilst the lower bistable catch 1520b can engage with the first engagement member 1371a provided on a first edge of a second of the two filter assemblies 1300b.

The two bistable catches 1520a, 1520b of the retention assembly 1500 are each arranged, in a first stable state, to engage an engagement member 1371 provided on a filter frame 1310 and thereby retain the filter assembly 1300 on the fan body 1100. Each bistable catch 1520a, 1520b is also arranged, in a second stable state, to disengage the engagement member 1371 provided on the filter frame 1310 and thereby release the filter assembly 1300 from the main body section 1110.

Figure 7C:
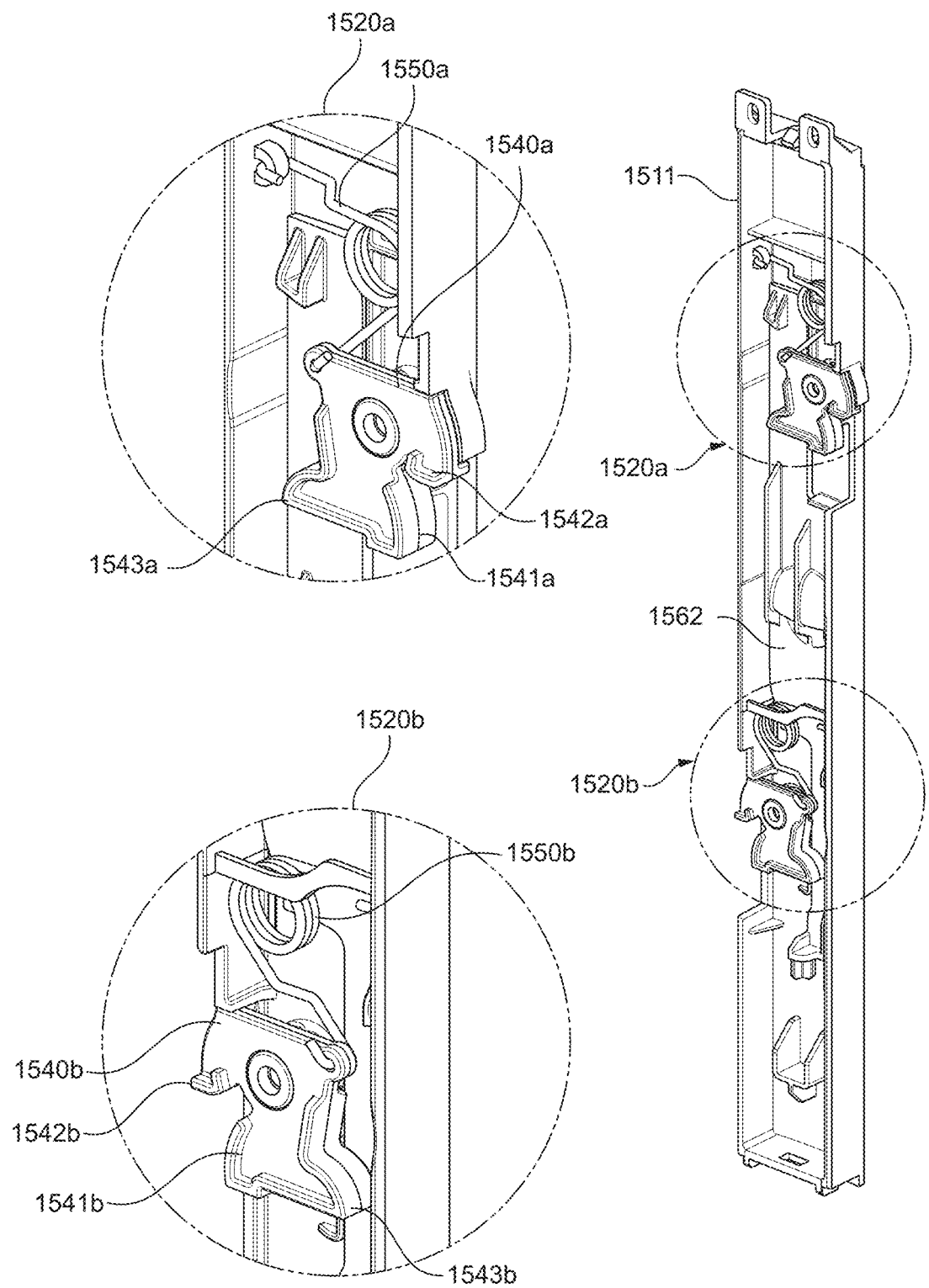
FIG. 7c is a rear view of the retention assembly of FIG. 7a and enlarged views of the bistable catches of the retention assembly.

FIG. 7c shows a perspective view of the retention assembly 1500 of FIGS. 7a and 7b together with enlarged views of the bistable catches 1520a, 1520b. In the illustrated embodiment, each bistable catch 1520a, 1520b comprises a catch body 1540 rotatably mounted within the housing 1510 of the retention assembly 1500 adjacent to a corresponding catch opening 1513, 1514 and a resilient member 1550 in the form of a torsion spring connected between the catch body 1540 and the housing 1510, the torsion spring 1550 being arranged to provide an over-centre action that switches the catch body 1540 between the first stable state and the second stable state.

The catch body 1540 comprises a first cam surface 1541 that is arranged to cause rotation of the catch body 1540 from the second stable state to the first stable state when an engagement member 1371 provided on a filter frame 1310 is inserted into the housing 1510 of the retention assembly 1500 through the corresponding opening 1513, 1514. The catch body 1540 further comprises a retention surface 1542 that is arranged to retain the engagement member 1371 provided on the filter frame 1310 within the housing 1510 of the retention assembly 1500 when the catch body 1540 is in the first stable state. The catch body 1540 then further comprises a second cam surface 1543 that is arranged to cause rotation of the catch body 1540 from the first stable state to the second stable state when the release mechanism 1560 is operated by a user.

The release mechanism 1560 of each retention assembly 1500 then comprises a button 1561 that is arranged to cause movement of a release member 1562 when operated by a user, the release member 1562 being arranged such that movement of the release member 1562 causes both of the bistable catches 1520*a*, 1520*b* to switch from the first stable state. To do so, the release member 1562 is arranged to be held by a resilient member 1563, in the form of a return or compression spring, in an initial/end position in which the release member 1562 allows both of the bistable catches 1520*a*, 1520*b* to remain in the first stable state. Movement of the release member 1652 by a user is then against a resistance provided by the return/compression spring 1563, with the return/compression spring 1563 causing the release member 1562 to return to the initial/end position when the force applied to the release member 1562 by the user is removed.

As illustrated in FIGS. 7*a*, 7*b* and 7*c*, the button 1561 is provided on the release member 1562, the release member 1562 being located within the housing 1510 with the button 1561 being aligned with and projecting through a button opening 1515 formed in the first housing section 1511 so that the button 1561 is accessible to the user. The release member 1562 is then arranged to slide within the housing 1510 of the retention assembly 1500 when the button 1561 is pressed by a user. To do so, the button 1561 is arranged so that when the user presses on the button 1561 in a direction that is parallel to the longitudinal axis of the housing 1510, the button 1561 moves longitudinally within the button opening 1515. Being provided on the release member 1562, the longitudinal movement of the button 1561 causes corresponding longitudinal movement of the release member 1562 within the housing 1510 against the resistance provided by the compression spring 1563, with the compression spring 1563 being connected between the release member 1562 and the housing 1510.

The release member 1562 is then provided with two projections/tabs 1564, 1565 that are arranged to push against the second cam surface 1543 of each catch body 1540 as the release member 1562 slides away from its initial/end position and thereby cause rotation of the catch body 1540 from the first stable state to the second stable state. The projections/tabs 1564, 1565 provided on the release member 1562 are arranged such that both the upper bistable catch 1520*a* and the lower bistable catch 1520*b* of the retention assembly 1500 simultaneously switch from the first stable state. The longitudinal movement of the release member 1562 within the housing 1510 against the resistance provided by the compression spring 1563 therefore results in the release of the two engagement members 1371 retained by the retention assembly 1500.

As two retention assemblies 1500*a*, 1500*b* cooperate to retain both the first filter frame 1310*a* and the second filter frame 1310*b* on the main body section 1110, the complete release of the first filter frame 1310*a* and the second filter frame 1310*b* from the main body section 1110 requires the operation of the release mechanisms 1560*a*, 1560*b* of both retention assemblies 1500*a*, 1500*b*. Whilst this can be performed consecutively, with the release mechanism 1560 of one of the retention assemblies 1500*a*, 1500*b* being operated before the other, the release button 1561 of each release mechanism 1560*a*, 1560*b* can be operated using a single digit such that a user could operate both release mechanisms concurrently; using one hand for each release mechanism 1560*a*, 1560*b*.

Figure 8:
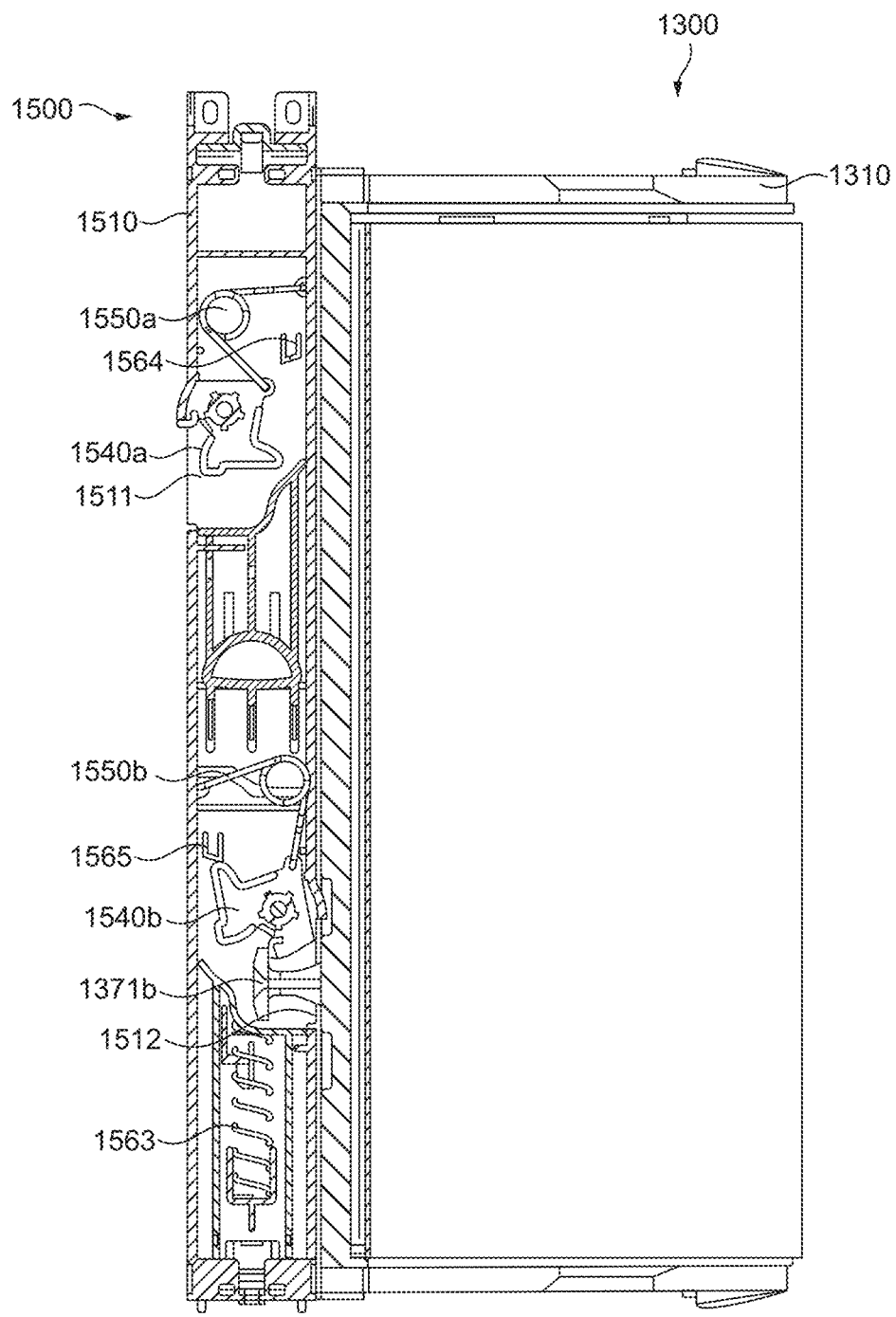
FIG. 8 is a cutaway view of one of the retention assemblies.

To further illustrate the functioning of the retention assembly 1500, FIG. 8 shows a cutaway view of one of the retention assemblies 1500 in which an engagement member 1371 provided on a filter frame 1310 is engaged by the lower bistable catch 1520*b* of the retention assembly 1500. As can be seen in FIG. 8, the upper bistable catch 1520*a* of the retention assembly 1500 is in the second stable state with the first cam surface 1541 of the upper bistable catch 1520*a* facing the upper catch opening 1513 of the housing 1510. The insertion of an engagement member 1371 into the housing 1510 through the upper catch opening 1513 would therefore cause rotation of the catch body 1540 from the second stable state to the first stable state. The upper bistable catch 1520*a* can therefore be considered to be open.

In contrast, the lower bistable catch 1520*b* of the retention assembly 1500 is in the first stable state with the retention surface 1542 of the lower bistable catch 1520*b* engaged with the one of the projecting hooks of the engagement member 1371 that has been inserted through the lower catch opening 1514 of the housing 1510. The lower bistable catch 1520*b* can therefore be considered to be closed. In addition, in the first stable state the second cam surface 1543 of the lower bistable catch 1520*b* is facing the lower tab 1565 that projects from the release member 1562. The sliding movement of the release member 1562 against the resistance provided by the compression spring 1563 would therefore cause the lower tab 1565 to push against the second cam surface 1543 of the catch body 1540, which would in-turn cause rotation of the catch body 1540 from the first stable state to the second stable state, thereby releasing the engagement member 1371 currently engaged by the catch body 1540. In addition, rotation of the catch body 1540 from the first stable state to the second stable state would also cause the first cam surface 1541 to push against the engagement member 1371 so as to drive it out of the housing 1500 through the adjacent opening 1514.

The fan assemblies described herein are therefore provided with filter assemblies that can easily be removed by a user, so that the filter media can be replaced if required, without the need to remove the nozzle and without the need for tools. In addition, whilst the fan assemblies described herein individually only cover a portion of the body of the fan assembly so that they are easier to remove, the mechanisms for retaining and releasing the filter assemblies are optimised so as to only cover a minimal portion of the fan body thereby maximising the area available for the air inlets and corresponding filter media. Furthermore, the mechanisms for retaining and releasing the filter assemblies automatically retain the filter assemblies when they are mounted on the fan body, whilst allowing the user to simultaneously release multiple filter assemblies by operating a release button using a single digit. Moreover, the identical filter assemblies and the mechanisms for retaining and releasing the filter assemblies all have two-fold rotational symmetry so that the filter assemblies can be retained on the fan body in either of two opposing orientations, further simplifying there removal and replacement by a user.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. For example, those skilled in the art will appreciate that the above-described invention might be equally applicable to other types of environmental control fan assemblies, and not just free standing fan assemblies. By way of example, such a fan assembly could be any of a freestanding fan assembly, a ceiling or wall mounted fan assembly and an in-vehicle fan assembly.

By way of further example, whilst the above described embodiments all relate to fan assemblies having a circular cylindrical fan body, various features described above would be equally applicable to embodiments in which the fan body has a shape other than cylindrical. For example, the fan body could have the shape of an elliptic cylinder, a cube or any other prism.

In addition, whilst the filter assemblies of the above described embodiments comprise only a single pair of engagement members, each of which are provided on opposing straight edges of the filter frame, those skilled in the art will appreciate that larger filter assemblies may require multiple pairs of engagement members, with the engagement members of each pair being on opposing straight edges of the filter frame. Such larger filter assemblies may therefore comprise multiple engagement members that are distributed along each of the opposing straight edges of the filter frame, whilst preferably maintaining the two-fold rotational symmetry of the filter frame. In this case, whilst it is preferable that the fan assembly has only a single pair of retention assemblies that cooperate to releasably retain both filter assemblies on the fan body, particularly larger filter assemblies may require two separate pairs of retention assemblies, with a first pair cooperating to releasably retain a first of the two filter assemblies on the fan body and a second pair cooperating to releasably retain a second of the two filter assemblies on the fan body.

The invention claimed is:

1. A filter assembly arranged to be mounted over an air inlet of a fan assembly, the filter assembly comprising:
   a filter frame arranged to support one or more filter media;
   wherein the filter frame is provided with a first engagement member on a first edge of the filter frame and a second engagement member on a second edge of the filter frame, the first edge being opposite to the second edge;
   wherein the first engagement member and the second engagement member are each configured to be engaged by a respective retention assembly via actuation of the retention assembly when the first and second engagement members are inserted into the retention assembly to thereby mount the filter assembly onto the fan assembly; and
   wherein the filter frame has two-fold rotational symmetry such that the filter frame can be retained on the fan assembly in either of two opposing orientations, and
   wherein the first engagement member and the second engagement member each comprise a projection from the filter frame where each of the projections has a pair of hooks that face in opposing directions.

2. The filter assembly of claim 1, wherein the first engagement member provided on the first edge of the filter frame is located towards a first end of the filter frame, and the second engagement member provided on the second edge of the filter frame is located towards an opposing second end of the filter frame.

3. The filter assembly of claim 2, wherein a distance between the first engagement member and the first end of the filter frame is equal to a distance between the second engagement member and the second end of the filter frame.

4. The filter assembly of claim 1, wherein the first engagement member is adjacent to a first corner of the filter frame and the second engagement member is adjacent to a diagonally opposing second corner of the filter frame.

5. The filter assembly of claim 1, wherein each hook comprises a projection extending from the filter frame having a distal end that is angled relative to a proximal end, the distal end extending in a direction that is parallel to a longitudinal axis of the filter frame.

6. The filter assembly of claim 1, wherein each pair of hooks comprises a single projection extending from the filter frame having a distal end comprising a pair of angled portions that are parallel to the longitudinal axis of the filter frame and that extend in opposing directions.

7. The filter assembly of claim 1, wherein the filter frame is provided with a first side flange that extends along a first side of the filter frame and a second side flange that extends along a second side of the filter frame.

8. The filter assembly of claim 7, wherein the first engagement member is provided on the first side flange and the second engagement member is provided on the second side flange.

9. The filter assembly of claim 1, wherein the filter frame is provided with a first end flange that extends along a first end of the filter frame and a second side flange that extends along a second end of the filter frame, the first end flange and the second end flange being arranged to support the one or more filter media.

10. The filter assembly of claim 1, wherein the filter frame is provided with a seal that extends around the entirety of an inner periphery of the filter frame.

11. The filter assembly of claim 10, wherein the filter frame is provided with a recess that extends around the entirety of the inner periphery of the filter frame and that is arranged to receive and support the seal.

12. The filter assembly of claim 11, wherein the filter frame has a first end and an opposing second end and is provided with a first side flange that extends along a first side of the filter frame and a second side flange that extends along a second side of the filter frame and wherein the recess extends across an inner surface of both the first side flange and second side flange, and across an inner edge of both the first end and the second end of the filter frame.

13. The filter assembly of claim 1, and further comprising:
   a first retention member provided on a first end of the filter frame and a second retention member provided on an opposing second end of the filter frame, wherein the first retention member and the second retention member are arranged to releasably retain a shroud when mounted on the filter assembly.

14. The filter assembly of claim 13, wherein each of the first retention member and the second retention member comprise a resilient catch or a resilient hook that is arranged to engage a corresponding through-hole provided on the shroud.

15. The filter assembly of claim 14, wherein the resilient catch or the resilient hook comprises a resilient arm, a distal end of the resilient arm being provided with a sloped projection, wherein the sloped projection slopes towards the distal end of the resilient arm.

16. The filter assembly of claim 13, wherein the filter frame is provided with one or more alignment ribs that are arranged to cooperate with a corresponding track or channel or groove provided on the shroud in order to guide the shroud onto the filter frame.

17. The filter assembly of claim 16, wherein the one or more alignment ribs is straight and extends in a direction that is parallel to a longitudinal plane that bisects the filter frame.

18. The filter assembly of claim 16, wherein the filter frame has a first end and an opposing second end and wherein the filter frame is provided with at least one alignment rib on each of the first end and the second end of the filter frame.

19. The filter assembly of claim 18, wherein the filter frame is provided with a first end flange that extends along the first end of the filter frame and a second side flange that extends along the second end of the filter frame, the first end flange and the second end flange being arranged to support the one or more filter media, and the first end flange and the second end flange of the filter frame are each provided with two alignment ribs.

20. The filter assembly of claim 19, wherein the first end flange and the second end flange of the filter frame are each provided with two additional alignment ribs.

21. The filter assembly of claim 1, wherein the filter assembly is semi-cylindrical in shape.

22. The filter assembly of claim 1, wherein the filter frame has a first edge and a second edge, the first edge and the second edge being parallel to a longitudinal axis of the filter frame, and wherein the filter frame further has a first end and a second end, the first end and the second end being perpendicular to the longitudinal axis of the filter frame, the first end and the second end each having an arc-shaped cross section in a plane perpendicular to longitudinal axis.

23. A filter assembly arranged to be mounted over an air inlet of a fan assembly, the filter assembly comprising:

a filter frame supporting one or more filter media;

wherein the filter frame has a first edge and a second edge, the first edge and the second edge being parallel to a longitudinal axis of the filter frame, and the first edge being opposite to the second edge;

wherein the filter frame has a first end and a second end, the first end and the second end being perpendicular to the longitudinal axis of the filter frame, the first end and the second end each having an arc-shaped cross section in a plane perpendicular to the longitudinal axis;

wherein the filter frame is provided with engagement members on the first edge and on the second edge, the engagement members on the first edge and the engagement members on the second edge being configured to be engaged by a respective retention assembly via actuation of the retention assembly when the first and second engagement members are inserted into the retention assembly to thereby mount the filter assembly onto the fan assembly; and each configured to be engaged by a respective retention assembly when on the fan assembly; and wherein the filter frame has two-fold rotational symmetry such that the filter frame can be retained on the fan assembly in either of two opposing orientations, and wherein the first engagement member and the second engagement member each comprise a projection from the filter frame where each of the projections has a pair of hooks that face in opposing directions;

wherein the engagement members on the first edge are offset along the longitudinal axis of the filter frame relative to the engagement members on the second edge.

24. The filter assembly as claimed in claim 23, wherein the engagement members on the first edge are unevenly distributed along the first edge and the engagement members on the second edge are unevenly distributed along the second edge.

25. The filter assembly as claimed in claim 23, wherein the filter frame has two-fold rotational symmetry such that the filter frame can be retained on the fan assembly in either of two opposing orientations.

* * * * *